US009626218B1

(12) United States Patent
Denisenko et al.

(10) Patent No.: US 9,626,218 B1
(45) Date of Patent: Apr. 18, 2017

(54) REPARTITIONING AND REORDERING OF MULTIPLE THREADS INTO SUBSETS BASED ON POSSIBLE ACCESS CONFLICT, FOR SEQUENTIAL ACCESS TO GROUPS OF MEMORY BANKS IN A SHARED MEMORY

(71) Applicant: Altera Corporation, San Jose, CA (US)

(72) Inventors: Dmitry Denisenko, Toronto (CA); Tomasz Czajkowski, Toronto (CA)

(73) Assignee: Altera Corporation, San Jose, CA (US)

( * ) Notice: Subject to any disclaimer, the term of this patent is extended or adjusted under 35 U.S.C. 154(b) by 152 days.

(21) Appl. No.: 14/203,420

(22) Filed: Mar. 10, 2014

(51) Int. Cl.
*G06F 9/50* (2006.01)
*G06F 9/48* (2006.01)

(52) U.S. Cl.
CPC .......... *G06F 9/4843* (2013.01); *G06F 9/4881* (2013.01); *G06F 9/5088* (2013.01)

(58) Field of Classification Search
CPC .............................. G06F 9/4881; G06F 9/5088
See application file for complete search history.

(56) References Cited

U.S. PATENT DOCUMENTS

| | | | | |
|---|---|---|---|---|
| 5,745,778 A * | 4/1998 | Alfieri | ................... | G06F 9/5088 711/133 |
| 5,826,081 A * | 10/1998 | Zolnowsky | ........... | G06F 9/4843 718/102 |
| 7,159,216 B2 * | 1/2007 | McDonald | ............ | G06F 9/4881 718/100 |
| 7,526,634 B1 * | 4/2009 | Duluk, Jr. | ................. | G06F 9/52 712/216 |
| 7,640,284 B1 * | 12/2009 | Goodnight | ................ | G06F 7/76 708/404 |
| 8,108,625 B1 * | 1/2012 | Coon | ................... | G06F 13/1663 711/127 |
| 8,607,234 B2 * | 12/2013 | Memik | ................. | G06F 9/3824 711/151 |
| 8,643,656 B2 | 2/2014 | Li et al. | | |
| 2003/0110203 A1 * | 6/2003 | Brenner | ................ | G06F 9/4843 718/103 |
| 2004/0261078 A1 * | 12/2004 | Abou-Emara | ........ | G06F 9/3851 718/107 |
| 2006/0004995 A1 * | 1/2006 | Hetherington | ........ | G06F 9/3885 712/235 |

(Continued)

*Primary Examiner* — Abdullah Al Kawsar
*Assistant Examiner* — Jorge A Chu Joy-Davila
(74) *Attorney, Agent, or Firm* — Treyz Law Group, P.C.; Andrew C. Milhollin

(57) ABSTRACT

Circuitry for dynamically ordering the execution of multiple threads in parallel is presented. The circuitry may include a control circuit that controls the execution of multiple subsets of threads using multiple processing units in parallel. Each of the plurality of processing units may be associated with an adjustable order thread issuer that may receive a subset of threads and an order in which to execute the subset of threads from the control circuit. The adjustable order thread issuer may manage the processing unit by providing each thread from the subset of threads for execution to the processing unit in the specified order. The adjustable order thread issuer may adjust the order in which threads are issued in an effort to optimize shared resource usage and thus improve the performance of a multithreaded application.

20 Claims, 9 Drawing Sheets

(56) References Cited

U.S. PATENT DOCUMENTS

| | | | |
|---|---|---|---|
| 2007/0061805 A1* | 3/2007 | Brenner | G06F 9/485 718/100 |
| 2008/0201629 A1* | 8/2008 | Duesterwald | G06F 11/3672 714/798 |
| 2010/0076941 A1* | 3/2010 | Dotsenko | G06F 17/10 707/705 |
| 2011/0072244 A1 | 3/2011 | Lindholm et al. | |
| 2011/0082961 A1* | 4/2011 | Minkin | G06F 13/4031 710/309 |
| 2013/0166881 A1 | 6/2013 | Choquette et al. | |
| 2013/0166882 A1 | 6/2013 | Choquette et al. | |
| 2013/0262831 A1 | 10/2013 | Nelson et al. | |
| 2013/0268715 A1* | 10/2013 | Fetterman | G06F 9/3851 711/5 |

* cited by examiner

REPARTITIONING AND REORDERING OF MULTIPLE THREADS INTO SUBSETS BASED ON POSSIBLE ACCESS CONFLICT, FOR SEQUENTIAL ACCESS TO GROUPS OF MEMORY BANKS IN A SHARED MEMORY

BACKGROUND

This invention relates to integrated circuits and, more particularly, to integrated circuits with dynamic thread order modules which issue threads and groups of threads in a specific order to take advantage of data locality and caching on a given platform.

Every transition from one technology node to the next technology node has resulted in smaller transistor geometries and thus potentially more functionality implemented per unit of integrated circuit area. Synchronous integrated circuits have further benefited from this development as evidenced by reduced interconnect and cell delays, which has led to performance increases. However, more recent technology nodes have seen a significant slow-down in the reduction of delays and thus to a slow-down in the performance increase.

To further increase the performance, solutions such as multithreading have been proposed, where several threads that share processing and storage resources are grouped into subsets and each of the subsets is executed in parallel. Each thread may access different portions of the shared resources, and thus the grouping into subsets and the order in which the threads in a subset are executed affect the overall performance.

Some platforms such as OpenCL do not guarantee the order in which threads are executed, and the lack of a thread order may lead to poor usage of the shared resources and a subsequent degradation of performance.

SUMMARY

Circuitry for dynamically ordering multiple threads is presented. The circuitry may include a plurality of processing units and an adjustable order thread issuer. Each of the plurality of processing units may be configured to execute at least one of the multiple threads. The adjustable order thread issuer may receive a subset of threads from the multiple threads and an order in which to execute the subset of threads. The adjustable order thread issuer may manage a predetermined processing unit of the plurality of processing units by providing each thread from the subset of threads for execution to the predetermined processing unit in the order in which to execute the subset of threads. The adjustable order thread issuer may further collect status information on the execution of each thread from the subsets of threads from the predetermined processing unit.

If desired, the circuitry may further include a controller circuit that is coupled to the adjustable order thread issuer. The controller circuit may provide the subset of threads and the order in which to execute threads in the subset of threads to the adjustable order thread issuer. For example, the controller circuit may provide a random order in which to execute threads in the subset of threads to the adjustable order thread issuer.

It is appreciated that the present invention can be implemented in numerous ways, such as a process, an apparatus, a system, a device, or instructions on a computer readable medium. Several inventive embodiments are described below.

In certain embodiments, the above mentioned adjustable order thread issuer may report collected status information on the execution of the threads in the subset of threads to the controller circuit. For example, the collected status information may indicate that the adjustable order thread issuer has finished executing all threads in the subset of threads.

If desired, the circuitry may include a configuration circuit that is coupled to the controller circuit. The configuration circuit may provide the controller circuit with a configuration that includes a predetermined partitioning of the multiple threads into a plurality of subsets of threads and the order in which to execute each subset of the plurality of subsets of threads.

Further features of the invention, its nature and various advantages, will be more apparent from the accompanying drawings and the following detailed description of the preferred embodiments.

DETAILED DESCRIPTION

This invention relates to integrated circuits and, more particularly, to integrated circuits with dynamic thread order modules which issue threads and groups of threads in a specific order to take advantage of data locality and caching on a given integrated circuit.

The thread order in a multi-threaded application execution may affect the interaction between the application and peripheral circuits such as processing and storage circuits. Storage circuits are often implemented as high-capacity, high-speed, and high-latency memories which provide improved performance for sequential memory access operations compared to random memory access operations. Thus, a thread order which is associated with random memory access operations may affect the performance of the multi-threaded application execution.

Therefore, it may be desirable to issue threads and groups of threads in a specific order that minimizes the bandwidth demand of memory access operations and maximizes the benefits of data locality and caching on a given integrated circuit.

It will be obvious to one skilled in the art, that the present exemplary embodiments may be practiced without some or all of these specific details. In other instances, well-known operations have not been described in detail in order not to unnecessarily obscure the present embodiments.

Embodiments relate to methods for using computer-aided design (CAD) tools, which are sometimes also referred to as design automation (DA) tools or electronic design automation (EDA) tools, for optimizing integrated circuit (IC) designs with register pipelining capabilities for implementation as integrated circuits. The integrated circuits may be any suitable type of integrated circuit, such as microprocessors, application-specific integrated circuits, digital signal processors, memory circuits, etc. If desired, the integrated circuits may be programmable integrated circuits that can be configured by a user to perform the functionality described in the integrated circuit design using programmable circuitry. The programmable circuitry can be configured by adjusting the settings of memory elements.

Figure 1:
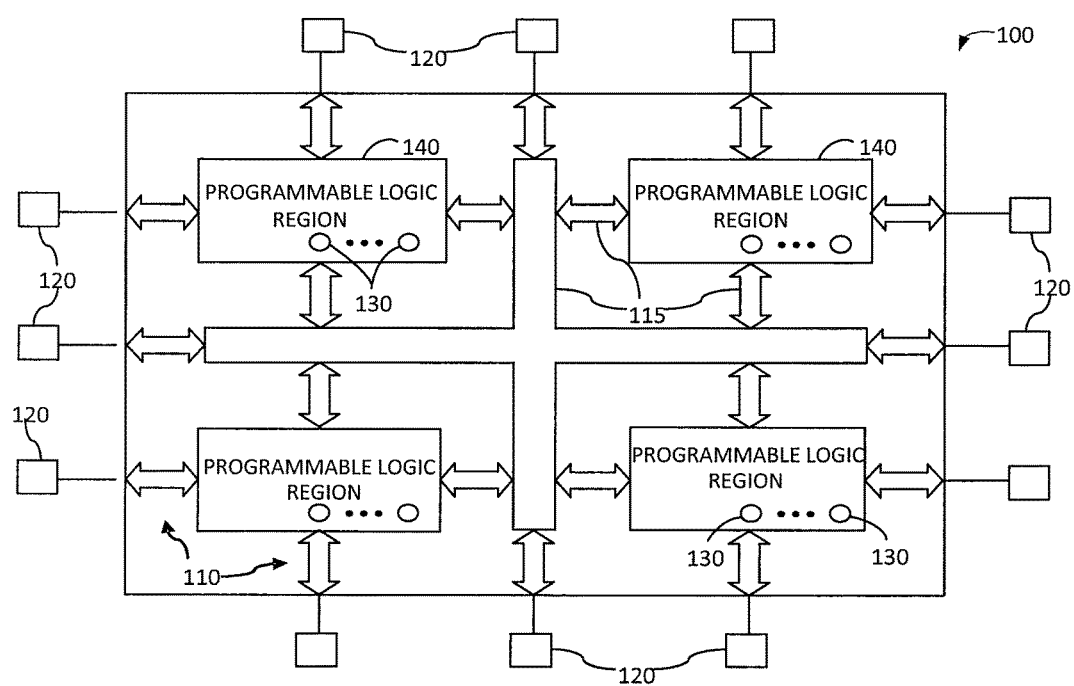
FIG. 1 is a diagram of an illustrative programmable integrated circuit with programmable logic regions in accordance with an embodiment.

An illustrative embodiment of an integrated circuit such as a programmable logic device 100 in accordance with the present invention is shown in FIG. 1.

Programmable logic device 100 has input/output circuitry 110 for driving signals off of device 100 and for receiving signals from other devices via input/output pins 120. Interconnection resources 115 such as global and local vertical and horizontal conductive lines and buses may be used to route signals on device 100.

Input/output circuitry 110 include conventional input/output circuitry, serial data transceiver circuitry, differential receiver and transmitter circuitry, or other circuitry used to connect one integrated circuit to another integrated circuit.

Interconnection resources 115 include conductive lines and programmable connections between respective conductive lines and are therefore sometimes referred to as programmable interconnects 115.

Programmable logic region 140 may include programmable components such as digital signal processing circuitry, storage circuitry, arithmetic circuitry, or other combinational and sequential logic circuitry. The programmable logic region 140 may be configured to perform a custom logic function. The programmable logic region 140 may also include specialized blocks that perform a given application and have limited configurability. For example, the programmable logic region 140 may include specialized blocks such as configurable storage blocks, configurable processing blocks, programmable phase-locked loop circuitry, programmable delay-locked loop circuitry, or other specialized blocks with limited configurability. The programmable interconnects 115 may also be considered to be a type of programmable logic region 140.

Programmable logic device 100 contains programmable memory elements 130. Memory elements 130 can be loaded with configuration data (also called programming data) using pins 120 and input/output circuitry 110. Once loaded, the memory elements each provide a corresponding static control signal that controls the operation of an associated logic component in programmable logic region 140. In a typical scenario, the outputs of the loaded memory elements 130 are applied to the gates of metal-oxide-semiconductor transistors in programmable logic region 140 to turn certain transistors on or off and thereby configure the logic in programmable logic region 140 and routing paths. Programmable logic circuit elements that may be controlled in this way include parts of multiplexers (e.g., multiplexers used for forming routing paths in programmable interconnects 115), look-up tables, logic arrays, AND, OR, NAND, and NOR logic gates, pass gates, etc.

Memory elements 130 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 130 are loaded with configuration data during programming, memory elements 130 are sometimes referred to as configuration memory, configuration RAM, or programmable memory elements.

The circuitry of device 100 may be organized using any suitable architecture. As an example, the logic of programmable logic device 100 may be organized in a series of rows and columns of larger programmable logic regions each of which contains multiple smaller logic regions. The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) containing multiple logic elements or multiple ALMs.

During device programming, configuration data is loaded into device 100 that configures the programmable logic regions 140 so that their logic resources perform desired logic functions. Circuit design systems may generate configuration data based on a user description of an integrated circuit design.

Figure 2A:
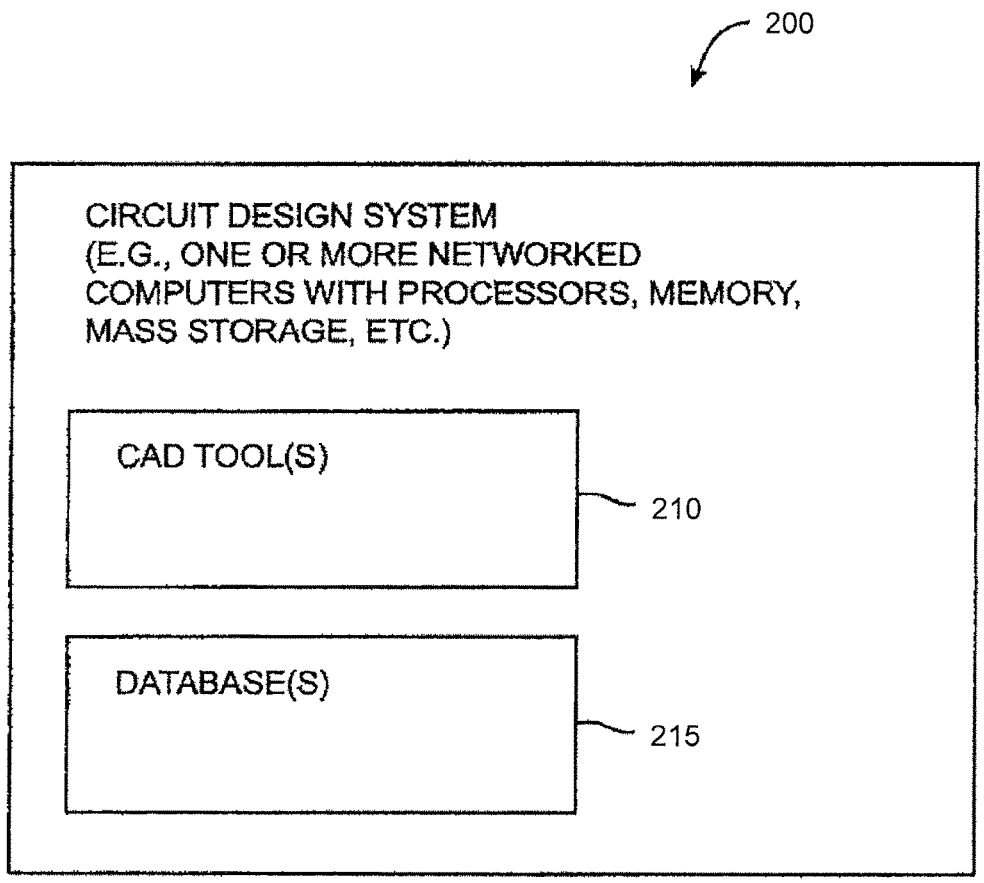
FIG. 2A is a diagram of a circuit design system that may be used to design integrated circuits in accordance with an embodiment.

An illustrative circuit design system 200 in accordance with the present invention is shown in FIG. 2A. System 200 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 210 and databases 215 reside on system 200. During operation, executable software such as the software of computer aided design tools 210 runs on the processor(s) of system 200. Databases 215 are used to store data for the operation of system 200. In general, software and data may be stored on any computer-readable medium (storage) in system 200. Such storage may include computer memory chips, removable and fixed media such as hard disk drives, flash memory, compact discs (CDs), digital versatile discs (DVDs), blu-ray discs (BDs), other optical media, and floppy diskettes, tapes, or any other suitable memory or storage device(s). When the software of system 200 is installed, the storage of system 200 has instructions and data that cause the computing equipment in system 200 to execute various methods (processes). When performing these processes, the computing equipment is configured to implement the functions of the circuit design system.

The computer aided design (CAD) tools 210, some or all of which are sometimes referred to collectively as a CAD tool or an electronic design automation (EDA) tool, may be provided by a single vendor or by multiple vendors. Tools 210 may be provided as one or more suites of tools (e.g., a compiler suite for performing tasks associated with implementing a circuit design in a programmable logic device) and/or as one or more separate software components (tools). Database(s) 215 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Tool 210 may receive any circuit design description. For example, a first circuit design description may be incorporated in an OpenCL kernel which is converted in method 220, diagrammed in FIG. 2B, into a second integrated circuit design description which can be used to implement an integrated circuit (e.g., a mask set for fabrication of an application specific integrated circuit or a configuration bitstream for a programmable logic device).

Method 220 starts with a kernel file (kernel.cl) 230. Parser front end 232 reads kernel file 230 and generates an unoptimized intermediate representation 234 (e.g., in the format of a Low Level Virtual Machine (LLVM) intermediate representation (IR)), which is converted by optimizer 236 to an optimized intermediate representation 238 (e.g., also in the format of a LLVM-IR). The optimization process includes well-known compiler techniques to make the code more efficient, such as, e.g., loop unrolling, memory-to-register conversion, dead code elimination, etc. A Register Timing Language (RTL) 240 generator converts optimized intermediate representation 238 into a hardware description language representation 242, which may be written in any hardware description language such as Verilog (shown) or VHDL.

Hardware description language representation(s) 242 of the kernel(s) are compiled into a programmable device configuration by appropriate computer aided design tools 244.

Although some or all of the various functions in method 220 may be executed by special-purpose hardware circuits dedicated to those functions, most or all of those functions would more commonly be performed by a processor.

Instructions for carrying out a method according to this invention for configuring an integrated circuit device may be encoded on a non-transitory machine-readable memory medium (e.g., a magnetic disk, a nonvolatile RAM, or an optical disk such as a CD ROM or DVD ROM), to be executed by a suitable computer or similar device to implement the method of the invention for programming or configuring PLDs or other devices with a configuration described by a high-level synthesis language as described above. For example, a personal computer may be equipped with an interface to which a PLD can be connected, and the personal computer can be used by a user to program the PLD using suitable software tools as described above.

Figure 2B:
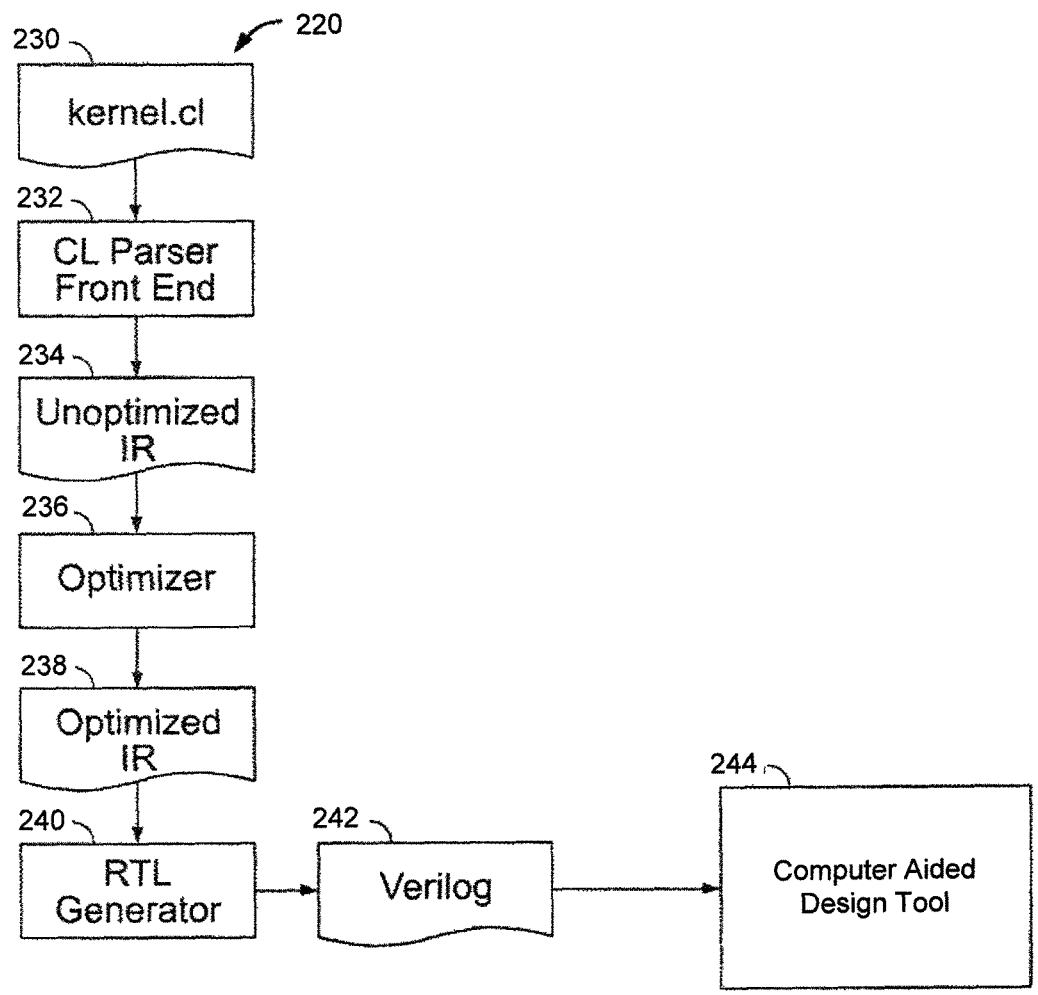
FIG. 2B is a diagram of an illustrative OpenCL compilation flow in accordance with an embodiment.
Figure 2C:
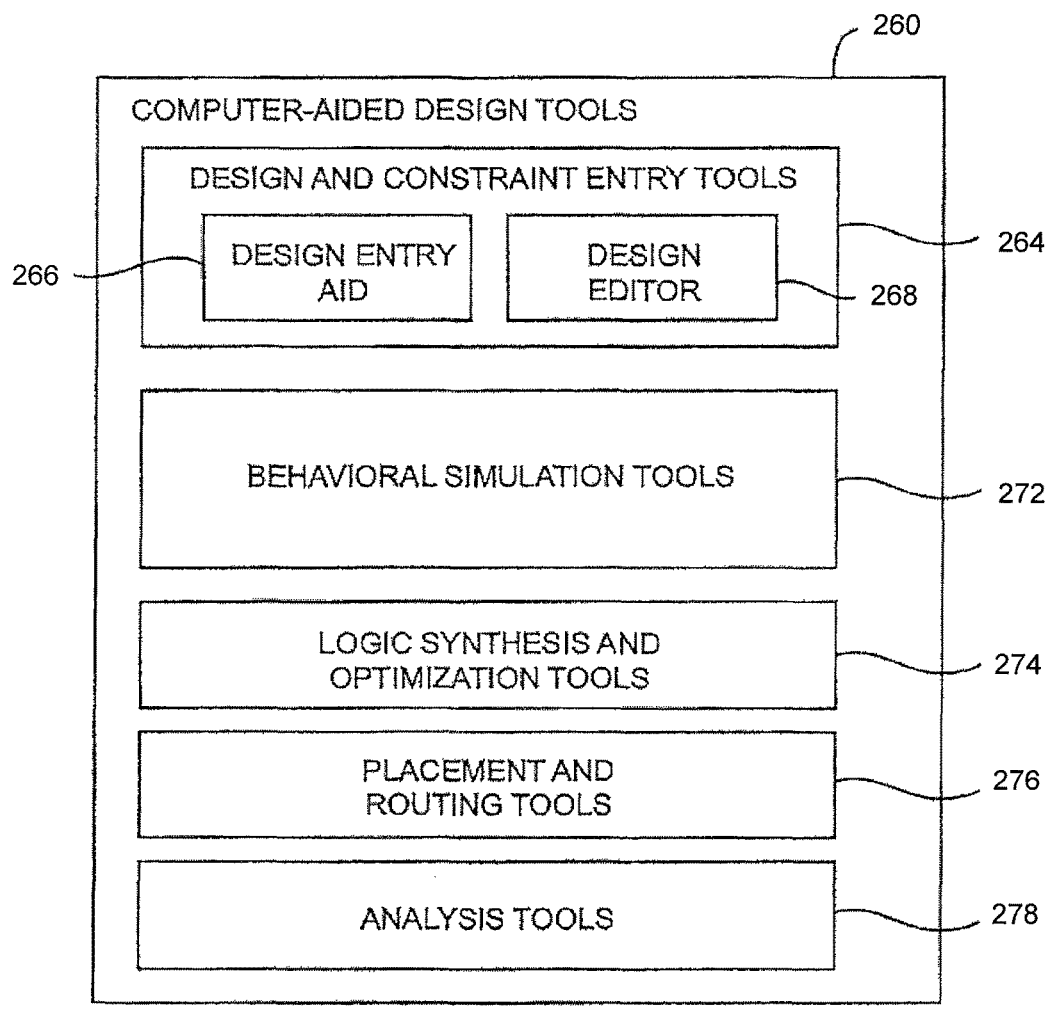
FIG. 2C is a diagram of illustrative computer-aided design (CAD) tools that may be used in a circuit design system in accordance with an embodiment.

Illustrative computer aided design tools 260 that may be used in a circuit design system such as circuit design system 200 of FIG. 2A or computer aided design tools 244 of FIG. 2B are shown in FIG. 2C.

The design process may start with the formulation of functional specifications of the integrated circuit design (e.g., a functional or behavioral description of the integrated circuit design). A circuit designer may specify the functional operation of a desired circuit design using design and constraint entry tools 264. Design and constraint entry tools 264 may include tools such as design and constraint entry aid 266 and design editor 268. Design and constraint entry aids such as aid 266 may be used to help a circuit designer locate a desired portion of the design (e.g., an intellectual property (IP) component) from a library of existing circuit designs and may provide computer-aided assistance to the circuit designer for entering (specifying) the desired circuit design.

As an example, design and constraint entry aid 266 may be used to present screens of options for a user. The user may click on on-screen options to select whether the circuit being designed should have certain features. Design editor 268 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 264 may allow a circuit designer to provide a desired circuit design using any suitable format. For example, design and constraint entry tools 264 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 264 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 264 may allow the circuit designer to provide a circuit design to the circuit design system 200 using a hardware description language such as Verilog hardware description language (Verilog HDL) or Very High Speed Integrated Circuit Hardware Description Language (VHDL). The designer of the integrated circuit design can enter the circuit design by writing hardware description language code with editor 268. Blocks of code may be imported from user-maintained or commercial libraries if desired.

After the design has been entered using design and constraint entry tools 264, behavioral simulation tools 272 may be used to simulate the functional performance of the circuit design. If the functional performance of the design is incomplete or incorrect, the circuit designer can make changes to the circuit design using design and constraint entry tools 264. The functional operation of the new circuit design may be verified using behavioral simulation tools 272 before synthesis operations have been performed using tools 274. Simulation tools such as behavioral simulation tools 272 may also be used at other stages in the design flow if desired (e.g., after logic synthesis). The output of the behavioral simulation tools 272 may be provided to the circuit designer in any suitable format (e.g., truth tables, timing diagrams, etc.).

Once the functional operation of the circuit design has been determined to be satisfactory, logic synthesis and optimization tools 274 may generate a gate-level netlist of the circuit design, for example using gates from a particular library pertaining to a targeted process supported by a foundry, which has been selected to produce the integrated circuit. Alternatively, logic synthesis and optimization tools 274 may generate a gate-level netlist of the circuit design using gates of a targeted programmable logic device (i.e., in the logic and interconnect resources of a particular programmable logic device product or product family).

Logic synthesis and optimization tools 274 may optimize the design by making appropriate selections of hardware to implement different logic functions in the circuit design based on the circuit design data and constraint data entered by the logic designer using tools 264.

After logic synthesis and optimization using tools 274, the circuit design system may use tools such as placement and routing tools 276 to perform physical design steps (layout synthesis operations). Placement and routing tools 276 are used to determine where to place each gate of the gate-level netlist produced by tools 274. For example, if two counters interact with each other, the placement and routing tools 276 may locate these counters in adjacent regions to reduce interconnect delays or to satisfy timing requirements specifying the maximum permitted interconnect delay. The placement and routing tools 276 create orderly and efficient implementations of circuit designs for any targeted integrated circuit (e.g., for a given programmable integrated circuit such as a field-programmable gate array (FPGA).)

Tools such as tools 274 and 276 may be part of a compiler suite (e.g., part of a suite of compiler tools provided by a programmable logic device vendor). In accordance with an embodiment, tools such as tools 274, 276, and 278 automatically take into account the effects of crosstalk between interconnects while implementing a desired circuit design. Tools 274, 276, and 278 may also include timing analysis tools such as timing estimators. This allows tools 274 and 276 to satisfy performance requirements (e.g., timing requirements) before actually producing the integrated circuit.

After an implementation of the desired circuit design has been generated using placement and routing tools 276 the implementation of the design may be analyzed and tested using analysis tools 278. After satisfactory optimization operations have been completed using tools 260 and depending on the targeted integrated circuit technology, tools 260 may produce a mask-level layout description of the integrated circuit or configuration data for programming the programmable logic device.

As an example, consider an OpenCL program which specifies the execution of multiple threads across multiple processing units (e.g., programmable logic regions on a programmable logic device). The multiple threads may be assigned to the different processing units and executed in a predetermined order.

Figure 3A:
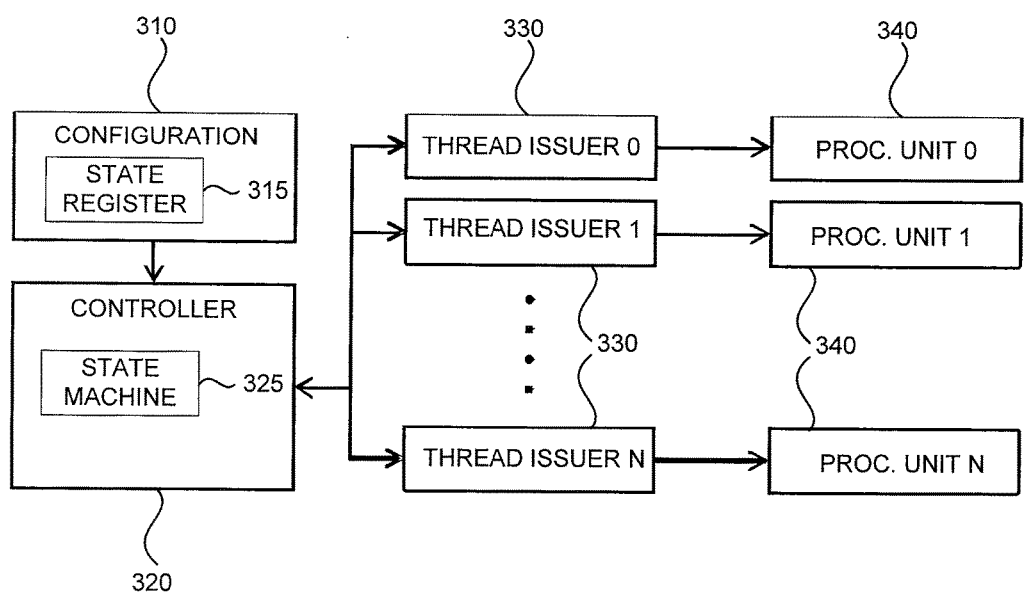
FIG. 3A is a diagram of illustrative dynamic thread order circuitry with a configuration circuit, a controller circuit, and multiple adjustable order thread issuers and processing units in accordance with an embodiment.

FIG. 3A is a diagram of illustrative dynamic thread order circuitry. For example, the dynamic thread order circuitry may be included in device 100 of FIG. 1. The dynamic thread order circuitry may include configuration circuit 310, controller circuit 320, multiple adjustable order thread issuers 330, and processing units 340. Configuration circuit 310 may receive and store a configuration. Configuration circuit 310 may receive the configuration from a user or from a program. The configuration may include multiple threads and a predetermined execution order for the multiple threads. If desired, the configuration may include the multiple threads arranged into subsets of threads, and a respective execution order of the threads in the subsets of threads may be associated with each subset of threads.

Controller circuit 320 may access the configuration stored in configuration circuit 310. Based on the configuration, controller circuit 320 may issue threads or subsets of threads to adjustable order thread issuers 330. For example, controller circuit 320 may issue a first subset of threads together with the order in which to execute the threads in the first subset of threads to THREAD ISSUER 0, a second subset of threads together with the order in which to execute the threads in the second subset of threads to THREAD ISSUER 1, etc.

Configuration circuit 310 may include a state register 315. State register 315 may store different values, and each of these different values may correspond to a different predetermined thread order implemented by controller circuit 320. In such a scenario, configuration circuit 310 may receive the configuration as a value that corresponds to a desired thread order and store the value in state register 315. Alternatively, the configuration may include a set of instructions that produce a desired sequence of threads when the set of instructions is executed by controller circuit 320.

Controller circuit 320 may include multiple state registers that form state machine 325. In the event that the configuration includes a set of instructions, controller circuit 320 may retrieve the set of instructions from configuration circuit 310 and produce a thread order based on the retrieved instructions.

The adjustable order thread issuer 330 that receives the subset of threads together with the given order in which to execute the threads in the subset of threads from controller circuit 320 may issue the threads for execution in the given order to a respective processing unit 340. Adjustable order thread issuer 330 may provide status information about the thread execution back to controller circuit 320. For example, adjustable order thread issuer 330 may send information to control circuit 320 when a thread is issued for execution to the processing unit 340 and when processing unit 340 has finished executing a thread. If desired, adjustable order thread issuer 330 may monitor the execution of individual threads by processing unit 340 and provide status information about the execution of the individual threads back to controller circuit 320.

In response to receiving status information from the adjustable order thread issuer 330 that a subset of threads has been executed, controller circuit 320 may issue another subset of threads for execution to the adjustable order thread issuer 330. The controller circuit 320 may issue more threads to a given adjustable order thread issuer 330 than what the corresponding processing unit 340 is able to handle. For example, the processing unit 340 may execute threads that include steps which require many resources and thus a long execution time (e.g., processing and storage resources combined with frequent memory access operations that have a long latency). The adjustable order thread issuer may manage the processing unit by only issuing a new thread when the processing unit has finished executing a current thread.

Figure 3B:
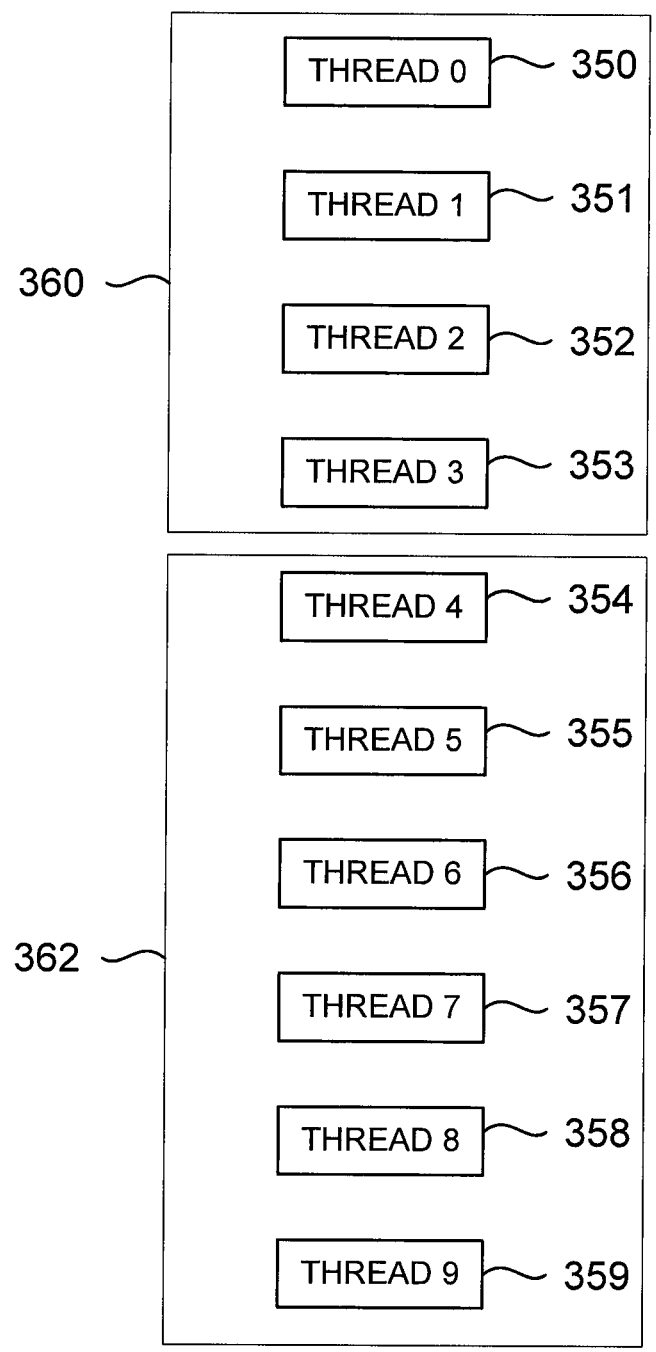
FIG. 3B is a diagram of illustrative grouping of multiple threads into two subsets of threads in accordance with an embodiment.

FIG. 3B shows an illustrative diagram of ten threads 350 to 359 that are partitioned in two subsets. Subset 360 may include threads 350 to 353 in the order THREAD 0, THREAD 1, THREAD 2, and THREAD 3. Subset 362 may include threads 354 to 359 in the order THREAD 4, THREAD 5, THREAD 6, THREAD 7, THREAD 8, and THREAD 9.

The identification of the threads and the thread order in subsets 360 and 362 is merely illustrative. If desired, the identification of threads may include multi-dimensional coordinates (e.g., three-dimensional coordinates from (0,0,0) to (x,y,z)). The threads may be partitioned into multiple subsets. If desired, the threads and the subsets of threads may be organized hierarchically. Each subset may have a predetermined order. The threads in a subset may have a lexicographical order, an inverse lexicographical order, a random order or any combination thereof. In the case of multi-dimensional coordinates, the thread order may iterate forward or backward over the different dimensions of the multi-dimensional coordinates and in different order of dimensions (e.g., first the x-coordinate, then the y-coordinate, and finally the z-coordinate), in random order, or in any combination thereof.

Figure 3C:
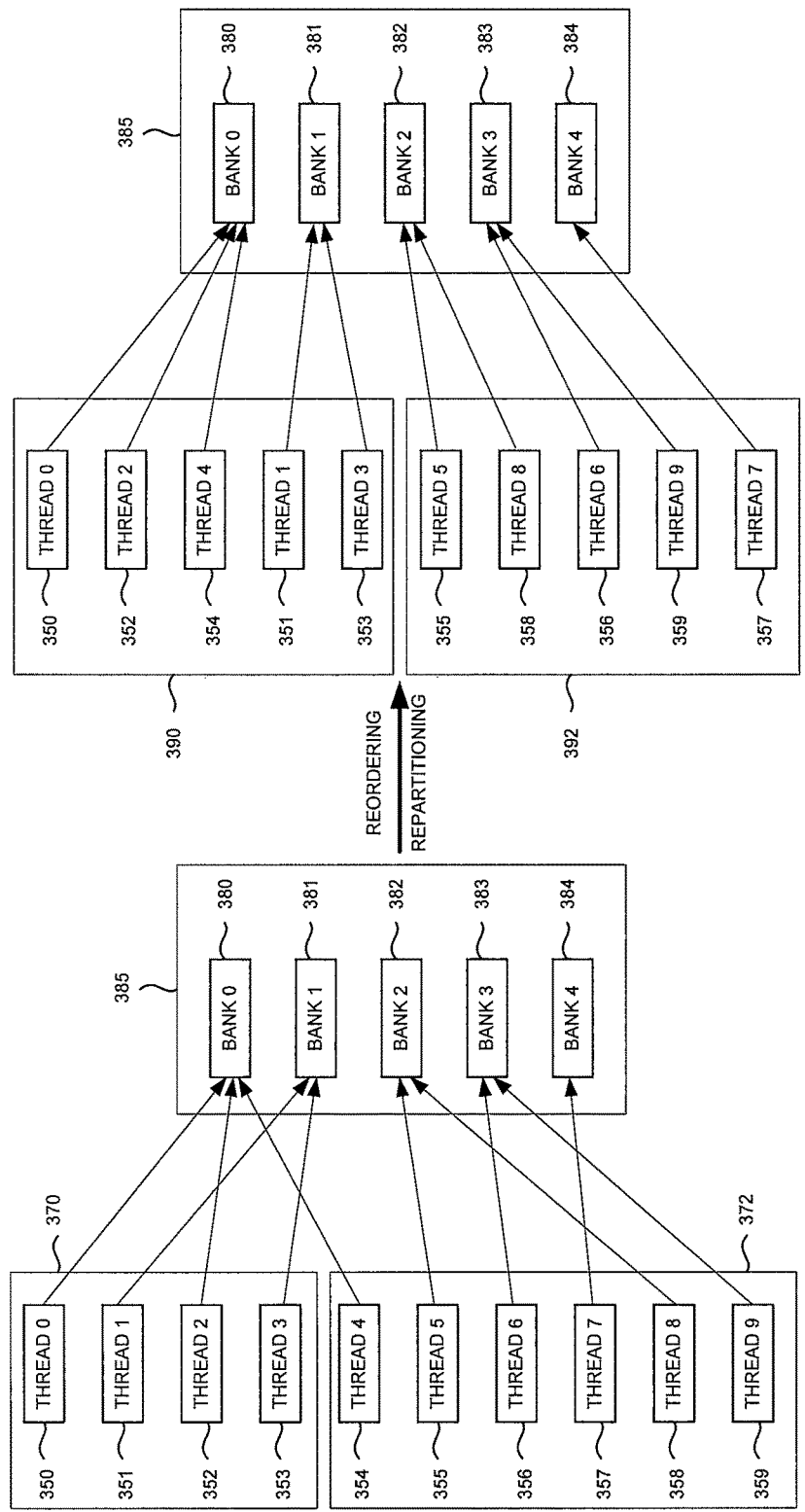
FIG. 3C is a diagram of illustrative reordering and repartitioning of multiple threads into two subsets of threads to improve physical and temporal locality of memory access operations in accordance with an embodiment.

A thread order that makes inefficient use of shared resources such as shared processing and storage circuits may negatively affect the benefits of multithreading. Therefore, changing the order of threads may provide for better cache utilization, lower external memory throughput requirements, and reduce stalls to shared portions of circuitry. FIG. 3C shows an example of two subsets of threads 370 and 372 that perform access operations to shared memory 385.

As shown, subset 370 may include threads 350 to 353 in the order THREAD 0, THREAD 1, THREAD 2, and THREAD 3. Subset 372 may include threads 354 to 359 in the order THREAD 4, THREAD 5, THREAD 6, THREAD 7, THREAD 8, and THREAD 9. Memory 385 may include five banks 380 to 384 (e.g., BANK 0, BANK 1, BANK 2, BANK 3, and BANK 4).

In the example of FIG. 3C, THREAD 0, THREAD 2, and THREAD 4 access data stored in BANK 0, THREAD 1 and THREAD 3 access data stored in BANK 1, THREAD 5 and THREAD 8 access data stored in BANK 2, THREAD 6 and THREAD 9 access data stored in BANK 3, and THREAD 7 accesses data stored in BANK 4. Consider further that the execution of subsets of threads 370 and 372 is issued by a control circuit (e.g., controller 320 of FIG. 3A) simultaneously to two adjustable order thread issuers (e.g., thread issuers 330 of FIG. 3A) which manage execution of the threads in two different processing units (e.g., processing units 340 of FIG. 3A).

Each thread may retrieve data from memory 385 during the execution of the thread. For example, THREAD 0 and THREAD 4 may simultaneously try to retrieve data from BANK 0 which may result a memory access conflict. Therefore, it may be beneficial to remove THREAD 4 from subset 372 and add THREAD 4 to subset 370. This is illustrated by subsets 390 and 392 in FIG. 3C. Subset 390 may include threads 350 to 354 arranged in the order THREAD 0, THREAD 2, THREAD 4, THREAD 1, and THREAD 3. Subset 392 may include threads 355 to 359 arranged in the order THREAD 5, THREAD 8, THREAD 6, THREAD 9, and THREAD 7. As shown, subset 390 accesses BANK 0 and BANK 1 of memory 385, while subset 392 accesses BANK 2, BANK 3, and BANK 4 of memory 385. Thus, a partitioning in subsets 390 and 392 may provide physical locality of memory access operations during execution of threads 350 to 359.

During the execution of a thread, the thread may store data in a cache. Threads that access a given bank of memory may store data in the cache that other threads which access the same bank of memory may be able to reuse. Thus, ordering the threads in a subset such that the same memory bank is accessed sequentially may reduce the number of cache misses.

As shown in subset 390 of FIG. 3C, the first three threads (i.e., threads 350, 352, and 354) may access BANK 0 to retrieve data, while the next two threads (i.e., threads 351 and 353) access BANK 1, thereby providing temporal locality of memory access operations, which refers to the reuse of the same data stored in a given memory location within a short period of time. Temporal locality of memory access operations may result in a reduced number of cache misses.

A user may employ different methods to identify a beneficial thread order. For example, the user may identify physical and temporal locality of data accesses among the threads and manually reorder the threads to achieve better cache utilization and more efficient servicing of memory access requests by the memory system.

In another example, the user may observe the performance of multiple different thread orders and select the order that leads to the best performance. Alternatively, the user may determine memory access patterns based on simulation results.

Figure 4:
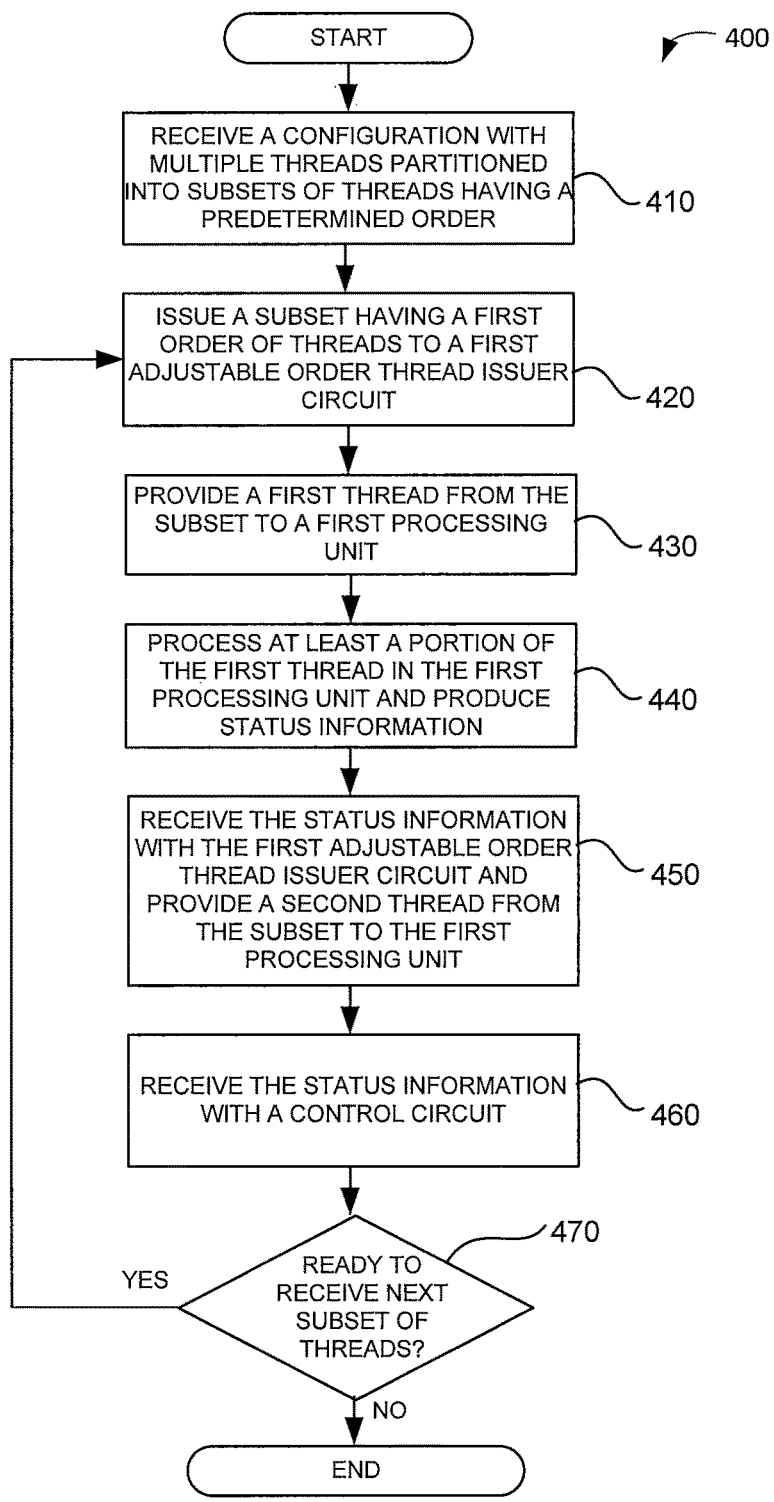
FIG. 4 is a flow chart of illustrative steps for managing the execution of multiple threads with a control circuit, an adjustable order thread issuer, and a processing unit in accordance with an embodiment.

FIG. 4 is a flow chart of illustrative steps for managing the execution of multiple threads with a control circuit, an adjustable order thread issuer circuit, and a processing unit such as the dynamic thread order circuitry of FIG. 3A. During step 410, the dynamic thread order circuitry may receive a configuration with multiple threads partitioned into subsets of threads each having a respective predetermined order (e.g., threads 350 to 359 partitioned into subsets 390 and 392 as shown in FIG. 3C).

During step 420, the dynamic thread order circuitry may issue a subset (e.g., subset 390) of threads with the threads arranged in the respective predetermined order of that subset to an adjustable order thread issuer circuit, and the adjustable order thread issuer circuit may issue a first thread from the subset (e.g., thread 350 of subset 390) to a processing unit during step 430.

During step 440, the processing unit may process at least a portion of the first thread and produce status information on the execution of the thread. The adjustable order thread issuer circuit may receive the status information from the processing unit during step 450 and provide a second thread from the subset to the processing unit when the status information indicates that the processing unit has finished executing the first thread. When the processing unit has finished executing all threads in the first subset, the adjustable order thread issuer circuit may send corresponding status information to the control circuit during step 460.

If a next subset of threads is awaiting execution, the control circuit may determine whether the adjustable order thread issuer circuit is ready to receive the next subset of threads during step 470. In the event that the adjustable order thread issuer circuit is ready to receive the next subset of threads, the control circuit may issue the next subset of threads to the adjustable order thread issuer circuit during step 420.

The execution of a multi-threaded program often implies the use of synchronization primitives to ensure that concurrently executing threads do not execute specific portions of the program at the same time. A multi-threaded program with improper use of synchronization primitives may produce correct results on one platform, but incorrect results on another platform. For example, a multi-threaded program may execute correctly on a programmable logic device, but produce incorrect results on a digital signal processor circuit.

Executing the same multi-threaded program with different thread orders may enable the detection of improper synchronization primitives on a single platform.

Figure 5:
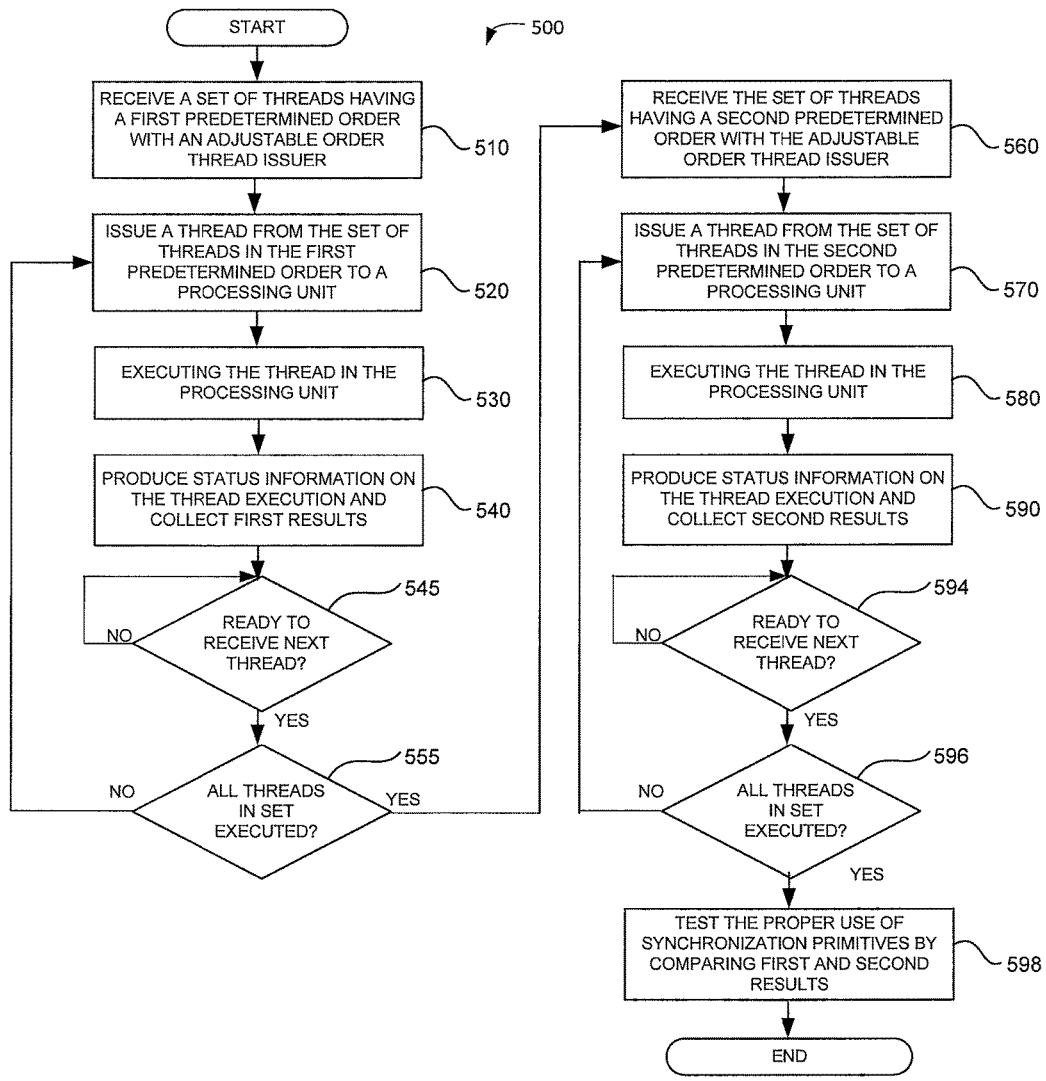
FIG. 5 is a flow chart of illustrative steps for testing the use of synchronization primitives in an application with multiple threads in accordance with an embodiment of the invention.

FIG. 5 is a flow chart of illustrative steps for testing the use of synchronization primitives in an application with multiple threads using a dynamic thread order circuit such as the dynamic thread order circuitry of FIG. 3A. During step 510, an adjustable order thread issuer of the dynamic thread order circuit may receive a set of threads having a first predetermined order from a control circuit. During step 520, the adjustable order thread issuer may issue a thread from the set of threads in the first predetermined order to a processing unit. The processing unit may execute the thread during step 530.

During step 540, the adjustable order thread issuer may produce corresponding status information and collect the first results from the processing unit. During step 545, the adjustable order thread issuer may determine whether the processing unit is ready to receive the next thread. In response to determining that the processing unit is ready to receive the next thread, the adjustable order thread issuer may determine whether all threads in the set of threads have been executed by the processing unit during step 555.

In response to determining that not all threads in the set have been executed, the adjustable order thread issuer may issue a next thread from the set of threads in the first predetermined order to the processing unit during step 520. The adjustable order thread issuer may iterate through steps 520 to 555 for as long as the set of threads includes threads that have not been executed.

When all threads in the set of threads have been executed, the adjustable order thread issuer may provide this information to the control circuit, which may send the set of threads in a different order. During step 560, the adjustable order thread issuer may receive a set of threads having a second predetermined order from the control circuit. During step 570, the adjustable order thread issuer may issue a thread from the set of threads in the second predetermined order to the processing unit. The processing unit may execute the thread during step 580.

During step 590, the adjustable order thread issuer may produce corresponding status information and collect the second results from the processing unit. During step 594, the adjustable order thread issuer may determine whether the processing unit is ready to receive the next thread. In response to determining that the processing unit is ready to receive the next thread, the adjustable order thread issuer may determine whether all threads in the set of threads have been executed by the processing unit during step 596.

In response to determining that not all threads in the set have been executed, the adjustable order thread issuer may issue a next thread from the set of threads in the second predetermined order to the processing unit during step 570. The adjustable order thread issuer may iterate through steps 570 to 596 for as long as the set of threads includes threads that have not been executed.

When all threads in the set of threads have been executed, the proper use of synchronization primitives may be tested by comparing the first and second results during 598. A difference in the first and second results may indicate an improper use of synchronization primitives.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), just to name a few.

The programmable integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable integrated circuit can be used to perform a variety of different logic functions. For example, the programmable integrated circuit can be configured as a processor or controller that works in cooperation with a system processor. The programmable integrated circuit may also be used as an arbiter for arbitrating access to a shared resource in the data processing system. In yet another example, the programmable integrated circuit can be configured as an interface between a processor and one of the other components in the system. In one embodiment, the programmable integrated circuit may be one of the families of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. Circuitry for dynamically ordering multiple threads, the circuitry comprising:

a plurality of processing units that are each configured to execute at least one of the multiple threads;

shared memory coupled to the plurality of processing units;

a configuration circuit that re-partitions at least two original subsets of threads of the multiple threads into a first subset of threads and a second subset of threads by moving at least one thread of one subset of the at least two original subsets of threads to another subset of the at least two original subsets of threads based on a possible resource access conflict between threads of the at least two original subsets of threads during parallel execution, wherein the first subset of threads requires access to a first group of memory banks in the shared memory, and wherein the second subset of threads requires access to a second group of memory banks in the shared memory that is different from the first group of memory banks;

a first adjustable order thread issuer that receives the first subset of threads and a first order in which to execute the first subset of threads, wherein the adjustable order thread issuer manages a first predetermined processing unit of the plurality of processing units by providing each thread from the first subset of threads for execution to the first predetermined processing unit in the first order in which to execute the first subset of threads and by collecting status information on the execution of each thread from the first subset of threads from the first predetermined processing unit, and wherein the first subset of threads sequentially accesses the first group of memory banks in the shared memory during the execution of the threads; and a second adjustable order thread issuer that receives the second subset of threads and a second order in which to execute the second subset of threads, wherein the second adjustable order thread issuer manages a second predetermined processing unit of the plurality of processing units by providing each thread from the second subset of threads for execution to the second predetermined processing unit in the second order in which to execute the second subset of threads and by collecting status information on the execution of each thread from the second subset of threads from the second predetermined processing unit, and wherein the second subset of threads sequentially accesses the second group of memory banks in the shared memory, wherein the first subset of threads are executed on the first predetermined processing unit in parallel with the second subset of threads executing on the second predetermined processing unit.

2. The circuitry of claim 1, wherein at least a portion of the first adjustable order thread issuer is implemented on a programmable logic device.

3. The circuitry of claim 1, further comprising:
a controller circuit that is coupled to the first adjustable order thread issuer, and wherein the controller circuit provides the first subset of threads and the first order in which to execute threads in the first subset of threads to the first adjustable order thread issuer.

4. The circuitry of claim 3, wherein the controller circuit provides a random order in which to execute threads in the first subset of threads to the first adjustable order thread issuer.

5. The circuitry of claim 3, wherein the adjustable order thread issuer reports collected status information on the execution of the threads in the subset of threads to the controller circuit.

6. The circuitry of claim 5, wherein the collected status information indicates that the first adjustable order thread issuer has finished executing all threads in the first subset of threads, and wherein the controller circuit provides a new subset of threads from the multiple threads and an order in which to execute threads in the new subset of threads to the first adjustable order thread issuer.

7. The circuitry of claim 1, wherein the first predetermined processing unit and the second predetermined processing unit access data that is stored in a cache, and wherein the controller circuit optimizes utilization of the cache by adjusting the first order and the second order.

8. The circuitry of claim 1, wherein the first predetermined processing unit and the second predetermined processing unit access common hardware resources, and wherein the controller circuit optimizes utilization of the common hardware resources by adjusting the first order and the second order.

9. The circuitry of claim 1, wherein the controller circuit revokes an unexecuted thread from the first subset of threads and removes the unexecuted thread from the first subset of threads.

10. The circuitry of claim 9, wherein the controller circuit provides the unexecuted thread from the first subset of threads to the second adjustable order thread issuer and inserts the unexecuted thread into the second order in which to execute threads in the second subset of threads to balances work between the first and second adjustable order thread issuers.

11. A method for operating circuitry including first and second adjustable order thread issuer circuits, comprising:
with a configuration circuit, repartitioning at least two original subsets of threads into a first subset of threads and a second subset of threads by moving at least one thread of one of subset of the at least two original subsets of threads to another subset of the at least two original subsets of threads based on a possible resource access conflict between threads of the at least two original subsets of threads during parallel execution, wherein the first subset of threads requires access to a first group of memory banks in a shared memory, and wherein the second subset of threads requires access to a second group of memory banks in the shared memory that is different from the first group of memory banks;
with a control circuit, receiving the first and second subsets of threads having respective first and second orders from the configuration circuit;
with the control circuit, issuing the first subset of threads to the first adjustable order thread issuer circuit and issuing the second subset of threads to the second adjustable order thread issuer circuit;
with the first adjustable order thread issuer circuit, providing the first subset of threads in the first order to a first processing unit, wherein the first processing unit sequentially accesses the first group of memory banks in the shared memory; and
with the second adjustable order thread issuer circuit, providing the second subset of threads in the second order to a second processing unit, wherein the second processing unit sequentially accesses the second group of memory banks in the shared memory; and
executing the first subset of threads on the first processing unit in parallel with executing the second subset of threads on the second processing unit.

12. The method of claim 11, wherein at least one of the adjustable order thread issuer circuits is implemented on a programmable logic device.

13. The method of claim 11, wherein issuing the first subset of threads to the first adjustable order thread issuer circuit comprises:
with the control circuit, issuing the first subset of threads in a random order.

14. The method of claim 11, wherein the order of the second subset is different from the order of the first subset.

15. The method of claim 11, wherein providing the threads from the first subset in the first order to the first processing unit comprises:
with the first adjustable order thread issuer circuit, providing a first thread from the first subset according to the first order to the first processing unit;
with the first processing unit, processing at least a portion of the first thread and producing status information.

16. The method of claim 15, further comprising:
with the first adjustable order thread issuer circuit, receiving the status information from the first processing unit; and
providing a second thread from the first subset according to the first order to the first processing unit.

17. The method of claim 11, further comprising:
with the control circuit, receiving the status information from the first adjustable order thread issuer circuit; and
determining whether the first adjustable order thread issuer circuit is ready to receive a third subset of threads of the plurality of subsets of threads based on the received status information.

18. The method of claim 17, further comprising:
in response to determining that the first adjustable order thread issuer circuit is ready to receive the third subset of threads, issuing the third subset of threads to the first adjustable order thread issuer circuit.

19. The method of claim 11, wherein the first and second subsets of threads are from a multi-threaded program having synchronization primitives, the method further comprising:
producing first results by executing the first subset of threads in the first order on the first processing unit;
with the first adjustable order thread issuer circuit, providing the first subset of threads in a third order to the first processing unit;
producing second results by executing the first subset of threads in the third order on the first processing unit;
comparing the first and second results to determine whether the first and second results match; and
in response to determining that the first and second results do not match, identifying that the synchronization primitives in the multi-threaded program fail testing.

20. The method of claim 19, wherein at least one of the first and third predetermined orders is determined randomly.

\* \* \* \* \*